(12) United States Patent
Greimel

(10) Patent No.: US 11,794,403 B2
(45) Date of Patent: Oct. 24, 2023

(54) APPARATUS AND METHOD FOR CREATING A PATTERN FROM A FIRST FLUID IN A SECOND FLUID

(71) Applicant: Benjamin Greimel, Linz (AT)

(72) Inventor: Benjamin Greimel, Linz (AT)

(*) Notice: Subject to any disclaimer, the term of this patent is extended or adjusted under 35 U.S.C. 154(b) by 91 days.

(21) Appl. No.: 16/618,444

(22) PCT Filed: May 23, 2018

(86) PCT No.: PCT/AT2018/050012
§ 371 (c)(1),
(2) Date: Dec. 2, 2019

(87) PCT Pub. No.: WO2018/218264
PCT Pub. Date: Dec. 6, 2018

(65) Prior Publication Data
US 2021/0138718 A1    May 13, 2021

(30) Foreign Application Priority Data
Jun. 2, 2017 (AT) .............................. A 50467/2017

(51) Int. Cl.
*B33Y 10/00* (2015.01)
*B33Y 30/00* (2015.01)
(Continued)

(52) U.S. Cl.
CPC .......... *B29C 64/106* (2017.08); *B29C 64/209* (2017.08); *B33Y 10/00* (2014.12);
(Continued)

(58) Field of Classification Search
CPC ... B29C 64/106; B29C 64/209; B29C 64/112; B33Y 10/00; B33Y 30/00; B33Y 70/00;
(Continued)

(56) References Cited

U.S. PATENT DOCUMENTS 6,058,843 A * 5/2000 Young .................... B41J 2/175
101/483
6,176,874 B1 * 1/2001 Vacanti .................. A61F 2/022
623/1.44
(Continued)

FOREIGN PATENT DOCUMENTS

CN   106388970 U   2/2014
CN   204019803 U   12/2014
(Continued)

OTHER PUBLICATIONS

English language abstract, CN 204019803, Dec. 17, 2014.
English language abstract, CN 106388970, Feb. 15, 2014.
English language abstract, CN 106510898, Mar. 22, 2017.

*Primary Examiner* — Joseph S Del Sole
*Assistant Examiner* — Baileigh Kate Darnell
(74) *Attorney, Agent, or Firm* — Tiajoloff & Kelly LLP

(57) ABSTRACT

A method and a device are described for creating a pattern (7) of a first fluid in a second fluid, the density of which is adapted, as a function of the viscosity thereof, to the density of the first fluid, and wherein the two fluids are immiscible or are miscible only with difficulty, said device comprising a storage container (1) for the first fluid and an injector which is connected to the storage container (1) and is associated with a positioning unit (5). In order to make it possible to create floating patterns (7) of a first fluid in a second fluid, in particular in the food sector for creating predefined floating patterns (7) in beverages, it is proposed that the injector forms a capillary (3) which is connected to the storage container (1) via a metering device (4) and the length of which corresponds at least to the maximum pattern depth in the second fluid, and that the outlet tip (9) of the capillary (3) is movable by way of the positioning unit (5) in the longitudinal direction of the capillary (3) and in at least one direction transverse thereto.

17 Claims, 1 Drawing Sheet

(51) Int. Cl.
*B33Y 80/00* (2015.01)
*B29C 64/106* (2017.01)
*B29C 64/209* (2017.01)
*B29K 105/00* (2006.01)

(52) U.S. Cl.
CPC ...... *B33Y 30/00* (2014.12); *B29K 2105/0032* (2013.01); *B29K 2105/0058* (2013.01); *B29K 2105/0094* (2013.01)

(58) Field of Classification Search
CPC ............ B33Y 80/00; B29K 2105/0032; B29K 2105/0058; B29K 2105/0094
See application file for complete search history.

(56) References Cited

U.S. PATENT DOCUMENTS

| | | | |
|---|---|---|---|
| 9,109,195 B2 | 8/2015 | Zimmermann et al. | |
| 9,149,952 B2* | 10/2015 | Murphy | B29C 64/20 |
| 9,777,173 B2 | 10/2017 | Moore et al. | |
| 2005/0024424 A1 | 2/2005 | Murayama | |
| 2006/0105011 A1* | 5/2006 | Sun | G06F 30/00 |
| | | | 424/422 |
| 2006/0286218 A1* | 12/2006 | Salzman | A23L 23/00 |
| | | | 426/106 |
| 2007/0071851 A1* | 3/2007 | Baker | A23G 3/0097 |
| | | | 426/87 |
| 2008/0145639 A1* | 6/2008 | Sun | B29C 64/118 |
| | | | 428/304.4 |
| 2008/0226783 A1* | 9/2008 | Lavie | A23F 5/243 |
| | | | 99/279 |
| 2009/0263849 A1* | 10/2009 | Sun | B01L 3/502707 |
| | | | 435/29 |
| 2010/0062529 A1 | 3/2010 | Zimmermann et al. | |
| 2010/0074981 A1 | 3/2010 | Morales-Alvarez et al. | |
| 2010/0189842 A1* | 7/2010 | Toren | A23G 3/343 |
| | | | 426/631 |
| 2015/0050686 A1* | 2/2015 | Sheth | C12N 5/0062 |
| | | | 435/29 |
| 2016/0032121 A1 | 2/2016 | Moore et al. | |
| 2016/0067918 A1* | 3/2016 | Millar | B29C 64/40 |
| | | | 264/401 |
| 2016/0083681 A1* | 3/2016 | Tavana | B29C 64/112 |
| | | | 264/308 |
| 2018/0243980 A1* | 8/2018 | Erb | B29C 64/295 |
| 2018/0304531 A1* | 10/2018 | Gallant | B29C 64/314 |

FOREIGN PATENT DOCUMENTS

| | | |
|---|---|---|
| CN | 106510898 A | 3/2017 |
| DE | 102007004855 A1 | 8/2008 |
| DE | 102015214198 A1 | 2/2016 |

* cited by examiner

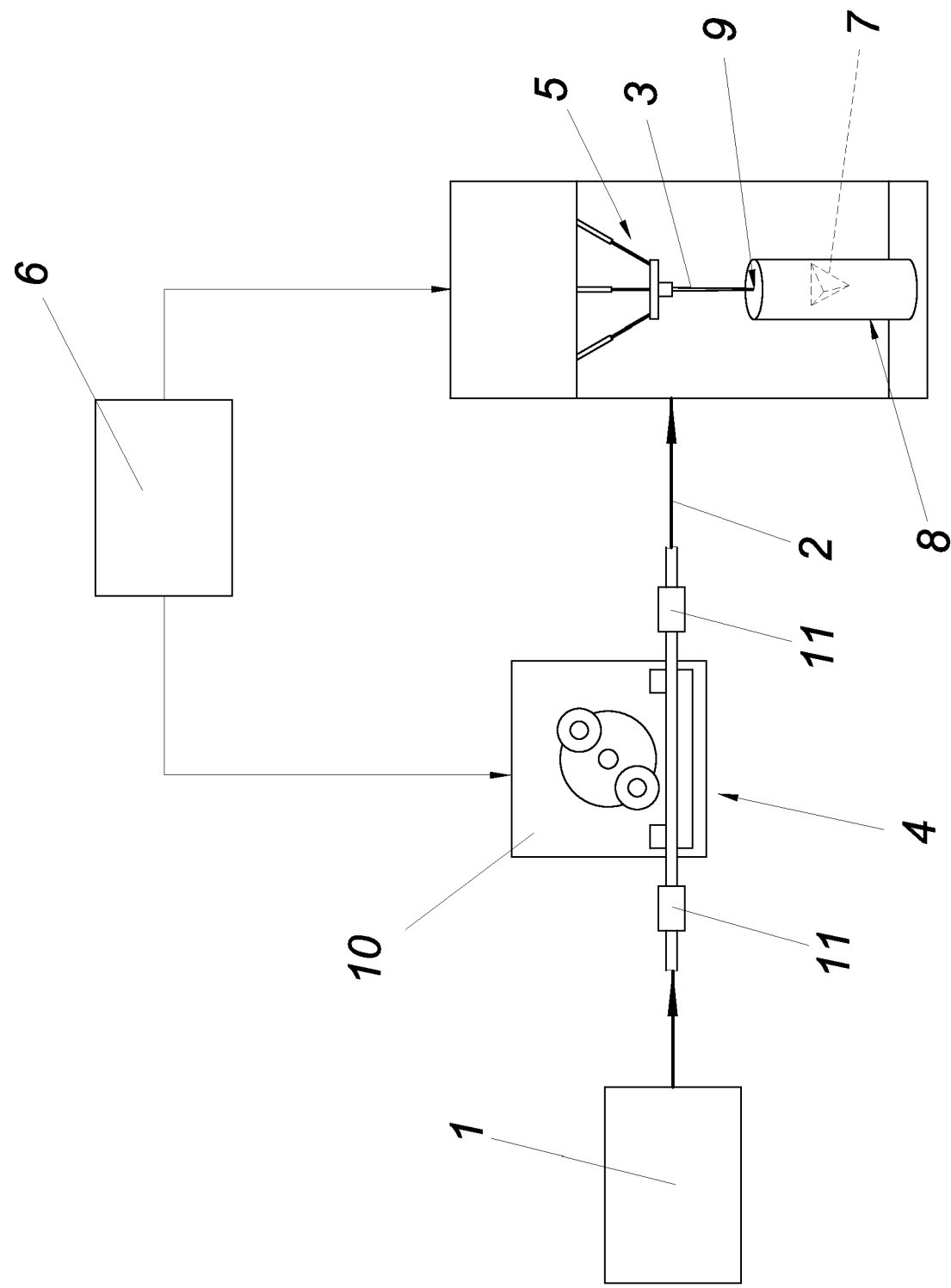

APPARATUS AND METHOD FOR CREATING A PATTERN FROM A FIRST FLUID IN A SECOND FLUID

TECHNICAL FIELD

The invention relates to a method and a device for creating a pattern of a first fluid in a second fluid, the density of which is adapted, as a function of the viscosity thereof, to the density of the first fluid, and wherein the two fluids are immiscible or are miscible only with difficulty, comprising a storage container for the first fluid and an injector which is connected to the storage container and is associated with a positioning unit, and also to a fluid combination therefor.

PRIOR ART

For printing three-dimensional patterns, printing methods are known in which a printing medium is applied, for example by heating, in a layerwise fashion to a support. As an alternative to this, a fluid can also be cured in a layerwise fashion, for example by UV irradiation.

For printing three-dimensional structures, such as for example also for foodstuffs, it has already been proposed (CN 204019803 U) to feed a printing medium via a peristaltic pump to a printing nozzle, in order to apply three-dimensional structures, likewise in a layerwise fashion, to a support by means of said printing nozzle.

However, said methods cannot be used to create floating patterns of a first fluid in a second fluid, the density of which is adapted, as a function of the viscosity thereof, to the density of the first fluid, and wherein the two fluids are immiscible or are miscible only with difficulty.

SUMMARY OF THE INVENTION

The problem addressed by the invention is therefore that of configuring a method and a device of the type described above such that it is possible to create floating patterns of a first fluid in a second fluid, in particular in the food sector for creating predefined floating patterns in beverages.

The invention solves the stated problem in that the injector forms a capillary which is connected to the storage container via a metering device and the length of which corresponds at least to the maximum pattern depth in the second fluid, and in that the outlet tip of the capillary is movable by way of the positioning unit in the longitudinal direction of the capillary and in at least one direction transverse thereto.

As a result of these measures, any pattern of the first fluid can be introduced as dots or as lines from the storage container into the second fluid by way of the metering device. To this end, the capillary must be configured such that the first fluid can be introduced into the second fluid by displacement in a metered fashion, and optionally also in the form of dots, without the capillary destroying, by its own movement in the second fluid, the parts of the pattern to be created that have already been introduced. The capillary action and the internal friction within the capillary in relation to the viscosity of the first fluid are of crucial importance here. Advantageous materials for the capillary are therefore glass or plastic for example. A capillary according to the invention also has a sufficiently small external diameter to prevent damaging the parts of the pattern to be created that have already been introduced. Since the outlet tip of the capillary is movable by way of the positioning unit in the longitudinal direction of the capillary and in at least one direction transverse thereto, flat three-dimensional patterns can already be created in the second fluid. If the positioning unit is configured such that the outlet tip of the capillary is movable in a further axis extending normal to the longitudinal direction and to the first transverse direction, then spatial three-dimensional patterns can also be created in the second fluid. This is the case, for example, when the positioning unit is configured in the form of linear delta kinematics. In this connection, it should be pointed out that all that matters for the invention is that the outlet tip of the capillary is movable, that is to say that, in theory, an orientation of the longitudinal axis of the capillary that is not normal to the surface of the second fluid is also conceivable. One particularly advantageous embodiment variant is obtained, in a manner that will be comprehensible to a person skilled in the art, when the longitudinal direction of the capillary coincides with the surface normal of the surface of the second fluid. The second fluid may be arranged below the injector in a vessel which is at least partially open at the top, such as a drinking glass for example. The second fluid need not completely fill the vessel, but instead may form, for example, only a layer within multiple fluids, said layer resulting from the density ratios. In order to make it possible for the capillary to be easily replaced, said capillary may be detachably connected to the positioning unit.

In order to create a regular and clean pattern, it is proposed that the capillary forms, at the outlet tip thereof, a break-off edge for the first fluid. The break-off edge must of course be formed on the inner rim of the outlet tip of the capillary, which is achieved for example by grinding off the capillary transversely to the longitudinal axis.

To enable hygienic sealing of the first fluid without the latter coming into direct contact with parts of the metering device, it is proposed that the metering device has a peristaltic pump for the first fluid. Especially in the case of fluids having a high viscosity, a peristaltic pump additionally enables easy changeover of the pump hose, which in one preferred embodiment is formed directly by the connecting line between the storage container and the capillary. The pulsation of the fluid to be pumped, which usually occurs in peristaltic pumps for technical reasons, is advantageous in the use case according to the invention as long as one pulse corresponds exactly to the metering unit for an injection operation.

However, since usually relatively small metering units are required, such as for example in the range from 1 to 3 µl, a respective check valve, which is open in the direction of the injector, may be arranged upstream and downstream of the peristaltic pump in the flow path of the first fluid. As a result of this measure, the peristaltic pump can be operated in a reversing manner, that is to say alternately in forward mode and reverse mode, so that even relatively small metering units can be reliably provided at the outlet tip of the capillary. In this connection, it is particularly advantageous to embody the drive of the peristaltic pump as a stepper motor for example, wherein in this case the otherwise necessary multiple rollers or shoes can also be reduced to exactly one roller or one shoe.

The subject matter of the invention is also a method for creating a pattern of a first fluid in a second fluid, the density of which is adapted, as a function of the viscosity thereof, to the density of the first fluid and the two fluids are immiscible or are miscible only with difficulty, wherein the capillary is introduced by the positioning unit into the second fluid at a first pattern position and, with the aid of the metering device, a predefined amount of the first fluid is introduced from the storage container via the capillary, at the outlet tip thereof, into the second fluid, after which the positioning unit executes a break-off movement with the outlet tip of the capillary. The break-off movement ensures that the first fluid does not form striations in the second fluid and that the desired defined pattern is formed. Together with a peristaltic pump in the flow path of the first fluid, having a respective check valve arranged upstream and downstream thereof, said check valves being open in the direction of the injector, a particularly advantageous injection of the first fluid into the second fluid can take place if the time at which the peristaltic pump is reversed coincides with the start of the break-off movement, because this additionally encourages the breaking-off of the fluid flow. Relative to the flow of fluid out of the capillary, the break-off movement itself takes place in a retraction or sideways movement of the outlet tip at a speed of 10 mm/s to 400 mm/s with an acceleration between 5 mm/s$^2$ and 6000 mm/s$^2$, depending on the fluid combination and injection speed.

Different pattern elements can be injected using the method according to the invention. For example, continuous lines can be created if the positioning unit moves the capillary further along a line of the pattern during the metered introduction of the second fluid into the first fluid.

However, as an alternative or in addition to this, pattern elements can also be created in a dotwise fashion if the pattern to be created is first resolved into individual injection points and the positioning unit moves the outlet tip of the capillary to one of the injection points as a pattern position, a predefined amount of the first fluid is introduced into the second fluid at the site of the injection point with the aid of the metering device, and the positioning unit executes with the outlet tip of the capillary a break-off movement and a movement to another of the injection points in such a way that the capillary does not cross any of the injection points that have already been introduced. Depending on the injection point, in this way for example 1-3 µl of the first fluid can be injected into the second fluid. The break-off movement may coincide with the movement to another of the injection points if, as a result, a retraction or sideways movement of the outlet tip relative to the flow of fluid out of the capillary will be initiated. This is the case, for example, when helical patterns are to be created along an axis that is substantially parallel to the capillary.

According to the invention, for the described device and the described method, consideration can be given to fluid combinations, wherein one of the fluids is an oil-based liquid and the other fluid is a water-based liquid, wherein the water-based liquid contains a thickening agent to increase the viscosity thereof. The thickening agent used for the aqueous fluid solution may be, for example, agar-agar, pectin, sago or others. In this case, an internal diameter of the capillary of 0.8 to 1.2 mm, in particular of 1 mm, has proven to be advantageous, particularly when using cooking oil. In principle, however, consideration is given to all fluid combinations, wherein the fluids either have an approximately matching density and/or have a sufficiently high viscosity. A high viscosity can compensate, at least temporarily, for a larger density difference and also facilitates the injection process because the pattern that has already been injected is protected against damage by a higher viscosity of the second fluid. A high viscosity also allows greater flexibility in the use of colour pigments because the latter, depending on the substance composition, can significantly influence the density of the injected amounts of the first fluid, which are indeed only small. An extremely high viscosity also allows a fluid combination between liquids and gases, such as for example air as the first fluid and honey as the second fluid. The fact that the density of the second fluid is adapted, as a function of the viscosity thereof, to the density of the first fluid thus means that the density and viscosity of the two fluids are adapted to one another such that, when the first fluid is injected into the second fluid in the sense of the invention, a floating pattern is created at least for a particular duration of a few minutes to several hours or even longer, which floating pattern, on account of the approximately matching densities and/or of the viscosity of the second fluid in particular, neither rises nor sinks in the second fluid nor changes its structure.

Since fluids which are immiscible or which are miscible only with difficulty usually have different densities, it is proposed in the aforementioned example that the oil-based liquid contains a colour pigment to increase the density thereof.

The colour pigment may be titanium oxide for example, due to the particularly high density thereof.

BRIEF DESCRIPTION OF THE INVENTION

In the drawing, the subject matter of the invention is shown by way of example, namely in a schematic illustration of the device according to the invention.

WAY OF IMPLEMENTING THE INVENTION

Such a device for creating a pattern of a first fluid in a second fluid, the density of which is adapted, as a function of the viscosity thereof, to the density of the first fluid, and wherein the two fluids are immiscible or are miscible only with difficulty, comprises a storage container 1 for the first fluid which is connected via a connecting line 2 (shown only schematically) to an injector configured as a capillary 3. Provided within the connecting line 2 between the storage container 1 and the capillary 3 is a metering device 4, with the aid of which metering units of the first fluid are conveyed to the capillary.

The capillary 3 is detachably connected to a positioning unit 5, which is actuated jointly with the metering device 4 via a common controller 6. To create a pattern 7 in a vessel 8 that is at least partially filled with the second fluid, the positioning unit 5 is configured such that it can move the outlet tip 9 of the capillary 3 in the longitudinal direction of the capillary 3 and in at least one direction transverse thereto. The positioning unit 5 may be configured, as in the exemplary embodiment shown, in the form of linear delta kinematics, which makes it possible to move the capillary 3 also in a further transverse direction which extends normal both to the longitudinal direction of the capillary 3 and to the at least first transverse direction.

The outlet tip 9 of the capillary 3 may form a break-off edge for the first fluid by the capillary 3 or the outlet tip 9 thereof being ground off transversely to the longitudinal direction of the capillary 3.

According to one advantageous embodiment of the invention, which is shown in the figure, the metering device 4 may have a peristaltic pump 10 for the first fluid, wherein a respective check valve 11, which is open in the direction of the injector configured as a capillary 3, is arranged upstream and downstream of the peristaltic pump 10 in the flow path of the first fluid, that is to say in the connecting line 2.

The invention claimed is:

1. A device for creating a pattern of a first fluid floating in a second fluid, said device comprising:
   a vessel containing the second fluid, said second fluid being a beverage;

a storage container storing the first fluid; and
an injector that is connected to the storage container and is associated with a positioning unit;
wherein the injector has a capillary that is connected to the storage container and receives the first fluid therefrom via a metering device, and has a length that corresponds at least to a maximum pattern depth in the second fluid, and
wherein an outlet tip of the capillary introduces the first fluid into the second fluid in an amount set by the metering device and is movable using the positioning unit in a longitudinal direction of the capillary and in at least one direction transverse thereto;
said outlet tip extending below a top surface of the second fluid and configured to make a deposition of the first fluid in the second fluid in a location below the surface of the first fluid so as to form the pattern of the first fluid in the second fluid floating below the surface of the second fluid;
wherein, after the deposition of the first fluid below the surface of the second fluid, the positioning unit is configured to cause the outlet tip to move in a break-off movement in a direction transverse to said longitudinal direction; and
wherein the first and second fluids are immiscible, and the first and second fluids each has a respective density and a respective viscosity, the density of the second fluid being adapted, as a function of the viscosity of the second fluid, to the density of the first fluid.

2. A device according to claim 1, wherein the capillary forms, at the outlet tip thereof, a break-off edge for the first fluid.

3. A device according to claim 1, wherein the metering device has a peristaltic pump pumping the first fluid.

4. A device according to claim 3, wherein a respective check valve that is open in a direction of the injector is arranged upstream and downstream of the peristaltic pump in a flow path of the first fluid.

5. A device according to claim 1 wherein one of the first and second fluids is an oil-based liquid and the other of the first and second fluids is a water-based liquid and has a viscosity, and wherein the water-based liquid contains a thickening agent that increases the viscosity of the other of the first and second fluids.

6. A device according to claim 5, wherein the oil-based liquid contains a color pigment that increases the density thereof.

7. A device according to claim 6, wherein the color pigment is titanium oxide.

8. A device according to claim 1, wherein the break-off movement has a speed of at least 10 mm/sec and an acceleration of at least 5 mm/sec$^2$.

9. The device of claim 1, wherein the densities of the first and second fluids are such that the first fluid forms a pattern in the second fluid that does not sink or rise for a period of time.

10. A method for creating a pattern of a first fluid floating in a second fluid, said method comprising:
providing a vessel containing the second fluid, wherein the second fluid is a beverage;
making a deposition of the first fluid in a pattern position in the second fluid so as to form the pattern floating in the second fluid, said deposition being made through an outlet end of a capillary supported for movement controlled by a positioning unit;
wherein the step of making of said deposition includes
moving the capillary using the positioning unit into the second fluid so that the capillary extends into the second fluid, and the outlet tip is positioned at the pattern position below the surface of the second fluid; and
introducing, using a metering device, a predefined amount of the first fluid from a storage container via the capillary, at the outlet tip thereof, into the second fluid at the pattern position below the surface of the second fluid; and then
executing with the positioning unit a break-off movement with the outlet tip of the capillary such that the outlet tip moves away from the pattern position after introducing the first fluid therein;
wherein the first and second fluids are immiscible, and each of the first and second fluids has a respective density and a respective viscosity, the density of the second fluid being adapted, as a function of the viscosity of the second fluid, to the density of the first fluid so as to reduce movement of the pattern in the second fluid due to flotation of the first fluid in the second fluid.

11. A method according to claim 10, wherein the positioning unit moves the capillary further along a line of the pattern during the metered introduction of the second fluid into the first fluid.

12. A method according to claim 10, wherein the method further comprises
making additional depositions of the first fluid in the second fluid each at a respective pattern position,
the making of the additional depositions comprising, for each additional deposition,
moving the outlet tip of the capillary using the positioning unit to a respective additional pattern position,
introducing another predefined amount of the first fluid into the second fluid at said respective additional pattern position using the metering device, and
executing another respective break-off movement and a movement of the capillary to another of the additional pattern positions with the positioning unit so that the capillary does not cross any of the pattern positions in which the first fluid has already been introduced.

13. A method according to claim 10, wherein one of the first and second fluids is an oil-based liquid and the other of the first and second fluids is a water-based liquid, and wherein the water-based liquid contains a thickening agent that increases the viscosity of the other of the first and second fluids.

14. A method according to claim 13, wherein the oil-based liquid contains a color pigment that increases the density thereof.

15. A method according to claim 14, wherein the color pigment is titanium oxide.

16. A method according to claim 10, wherein the predefined amount of the first fluid is introduced in a longitudinal direction, and, in the break-off movement, said outlet tip is moved in a direction transverse to said longitudinal direction at a speed of at least 10 mm/sec and an acceleration of at least 5 mm/sec$^2$.

17. A method according to claim 10, wherein the densities of the first and second fluids are such that the first fluid forms a pattern in the second fluid that does not sink or rise for a period of time.

* * * * *